United States Patent
Federow et al.

Patent Number: 5,296,853
Date of Patent: Mar. 22, 1994

[54] LASER ICE DETECTOR

[75] Inventors: Harold L. Federow; Jeffrey H. Silverman, both of Seattle, Wash.

[73] Assignee: The Boeing Company, Seattle, Wash.

[21] Appl. No.: 982,254

[22] Filed: Nov. 25, 1992

Related U.S. Application Data

[63] Continuation of Ser. No. 721,861, Jun. 25, 1991, abandoned, and a continuation-in-part of Ser. No. 371,231, Jun. 26, 1989, abandoned.

[51] Int. Cl.⁵ .............................................. G08B 21/00
[52] U.S. Cl. ................................ 340/962; 244/134 F; 340/581; 340/583
[58] Field of Search ............... 340/962, 580, 581, 583; 244/134 R, 134 F; 73/170 R; 364/563

[56] References Cited

U.S. PATENT DOCUMENTS

| | | | |
|---|---|---|---|
| 3,540,025 | 11/1970 | Levin et al. | 340/583 |
| 4,538,064 | 8/1985 | Kovacs | 250/573 |
| 4,797,660 | 1/1989 | Rein, Jr. | 340/583 |
| 4,803,470 | 2/1989 | Fineman | 340/583 |
| 5,014,042 | 5/1991 | Michoud et al. | 340/583 |

*Primary Examiner*—Brent Swarthout
*Attorney, Agent, or Firm*—Conrad O. Gardner; B. A. Donahue

[57] ABSTRACT

A detector system for detecting the formation of ice on an aircraft outer surface, e.g. wing skin. The ice detector system utilizes a light source, light detector and temperature sensor coupled together for providing signals representative of icing which may be utilized to provide an alarm to the cockpit of the aircraft. Built In Test Equipment (BITE) is also included in the detector system for system failure indication to the pilot of the aircraft.

4 Claims, 6 Drawing Sheets

LASER ICE DETECTOR

CROSS REFERENCE TO RELATED APPLICATIONS

This application is a continuation in part of application Ser. No. 371,231, filed Jun. 26, 1989, and now abandoned, and a continuation of Ser. No. 721,861, filed Jun. 25, 1991, and now abandoned.

BACKGROUND OF THE INVENTION

This invention relates to apparatus for detecting the formation of ice on an aircraft surface, and more particularly, to an ice detector system utilizing a light source, a light detector, and a temperature sensor in combination.

SUMMARY OF THE INVENTION

Prior art ice detector systems represented in the patent literature include Levin et al. U.S. Pat. No. 3,540,025 and e.g. Peters et al. U.S. Pat. No. 2,359,787. The prior art patent to Levin et al. utilizes a prism and a prism heater in contrast to the present system. The Peters et al. patent is similar to the Levin et al. patent but without the prism heater and temperature sensing elements. The present detector system for detecting formation of ice on an aircraft surface does not require a prism and utilizes an infrared laser, and a photodetector in contrast to the prior art systems.

The present invention overcomes the problems of the prior art which require e.g. prism heaters and e.g. prisms by providing a three element detector system which may be utilized in large quantities distributed over various strategic airplane locations. The present detector system may be fabricated in a single chip configuration of minute size and distributed over all critical regions of the aircraft to detect icing in any of the several critical surface areas of the aircraft.

It is accordingly an object of the invention to utilize a light source, a light detector, and temperature sensor in order to detect icing conditions due to the presencer of moisture and below freezing temperature conditions.

It is yet another object of the present invention to provide an ice detector system utilizing Built In Test Equipment (BITE).

In accordance with a preferred embodiment of the present invention a detector system for detecting the information of ice on an aircraft surface including a detector light source, a photodetector, and a thermistor connected to an interface circuit, all of which are embedded in a plastic surface mounted flush with the surface of the aircraft so that light emitted from the light source refracts along the plastic surface and is then detected by a photodetector. The angle of the emitted light with respect to the normal to the plastic surface is less than the critical angle for total internal reflection when the surface has water or ice on it; however, it is greater than the critical angle when the surface is adjacent to air. The BITE photodetector is also mounted to receive at this same angle such that light from the detector light source is reflected to it. The photodetector also senses light from the BITE light source and from the ray that travels along the surface in the case of total internal reflection emitted from the light source.

DESCRIPTION OF THE PREFERRED EMBODIMENTS

Figure 8:
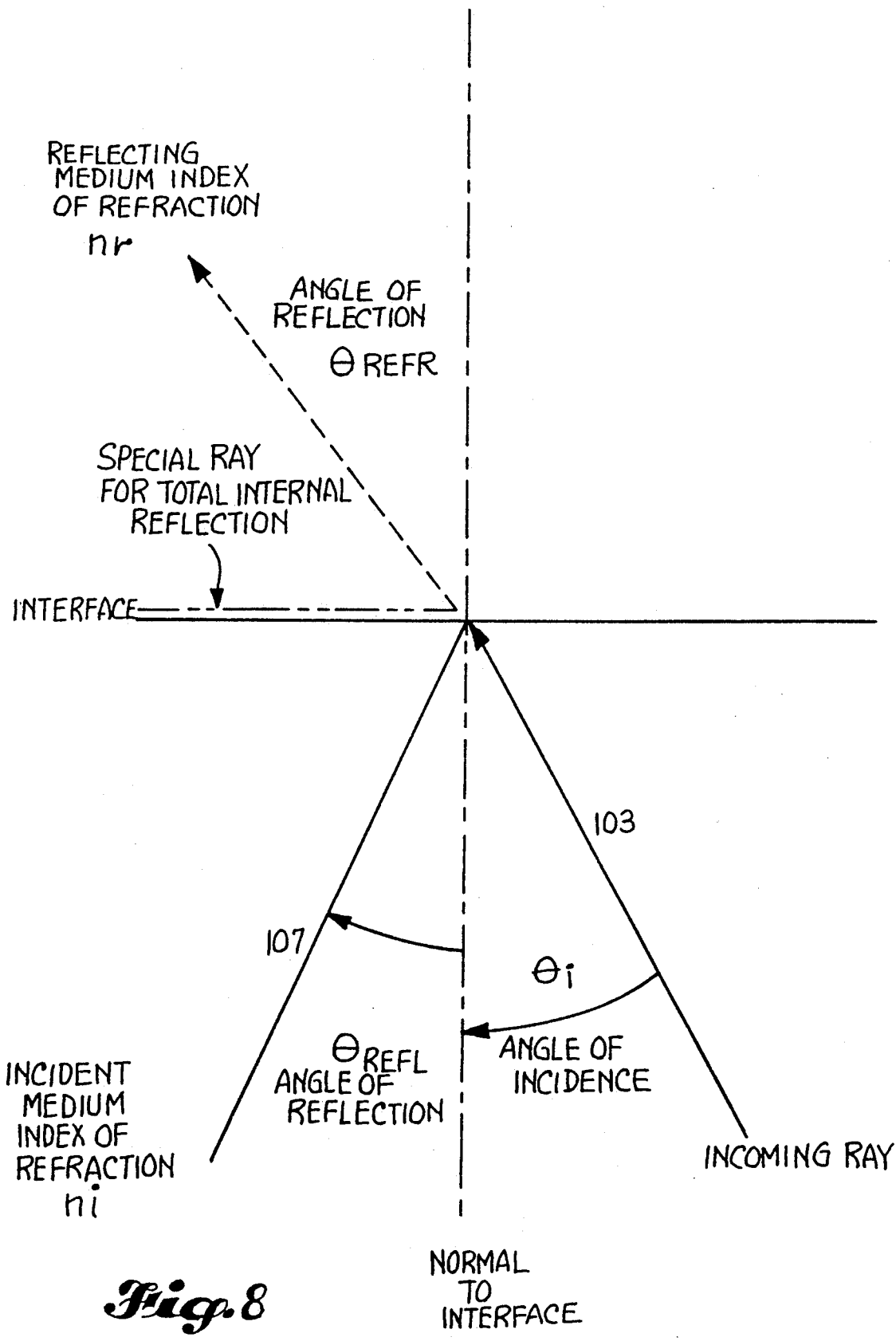

Preliminarily, turning to FIG. 8 there is shown a basic diagram describing an electromagnetic wave passing from one non-conducting medium to another. The angle of reflection is equal to the angle of incidence. The angle of refraction is related to the angle of incidence by Snell's Law:

$$n_r \sin(theta_{refr}) = n_i \sin(theta_i)$$

As can be seen the angle of the refracted ray with the normal is given by:

$$theta_{refr} = \sin^{-1}[(n_i/n_r)\sin(theta_i)]$$

When the second medium has a smaller refractive index than the first ($n_r$ is less than $n_i$) there is a value of the above expression for which the quantity in brackets equals and then exceeds one. Since the sine function must remain less than or equal to 1 there is "no" refracted ray.

This is the phenomenon of total internal reflection. Levin et al. U.S. Pat. No. 3,540,025 and Rein Jr. U.S. Pat. No. 4,797,660 rely on detecting the totally internally reflected ray ("TIR" ray) 107. When ice is on the detecting surface (as described above, this is not necessarily the surface of interest), there is no longer total reflection and refraction occurs. This refraction means that some of the energy that was reflected is refracted into the second medium. The reflected ray (which always exists) is thus lessened. Levin et al. and Rein Jr. detect this lessening, with Levin et al. cycling a prism surface with a heater and counting the number of times a lessening is detected. Both Levin et al and Rein Jr. must ensure that no stray light is allowed to enter the detector since that would defeat the ability to detect a lessening of the incoming light.

In actuality, even with total internal reflection there is a "refracted" ray. This "special" ray 101 travels along (or parallel) to the interface surface and is exponentially damped away from the interface in the second medium. This ray is detectable. It is only present when there is total internal reflection. In the absence of ice on the surface, this ray will be present. When the ice is present, refraction occurs and the special ray is absent. The present hereinafter described preferred embodiment of the invention relies on detecting the presence or absence of the "special" ray 101.

Figure 1:
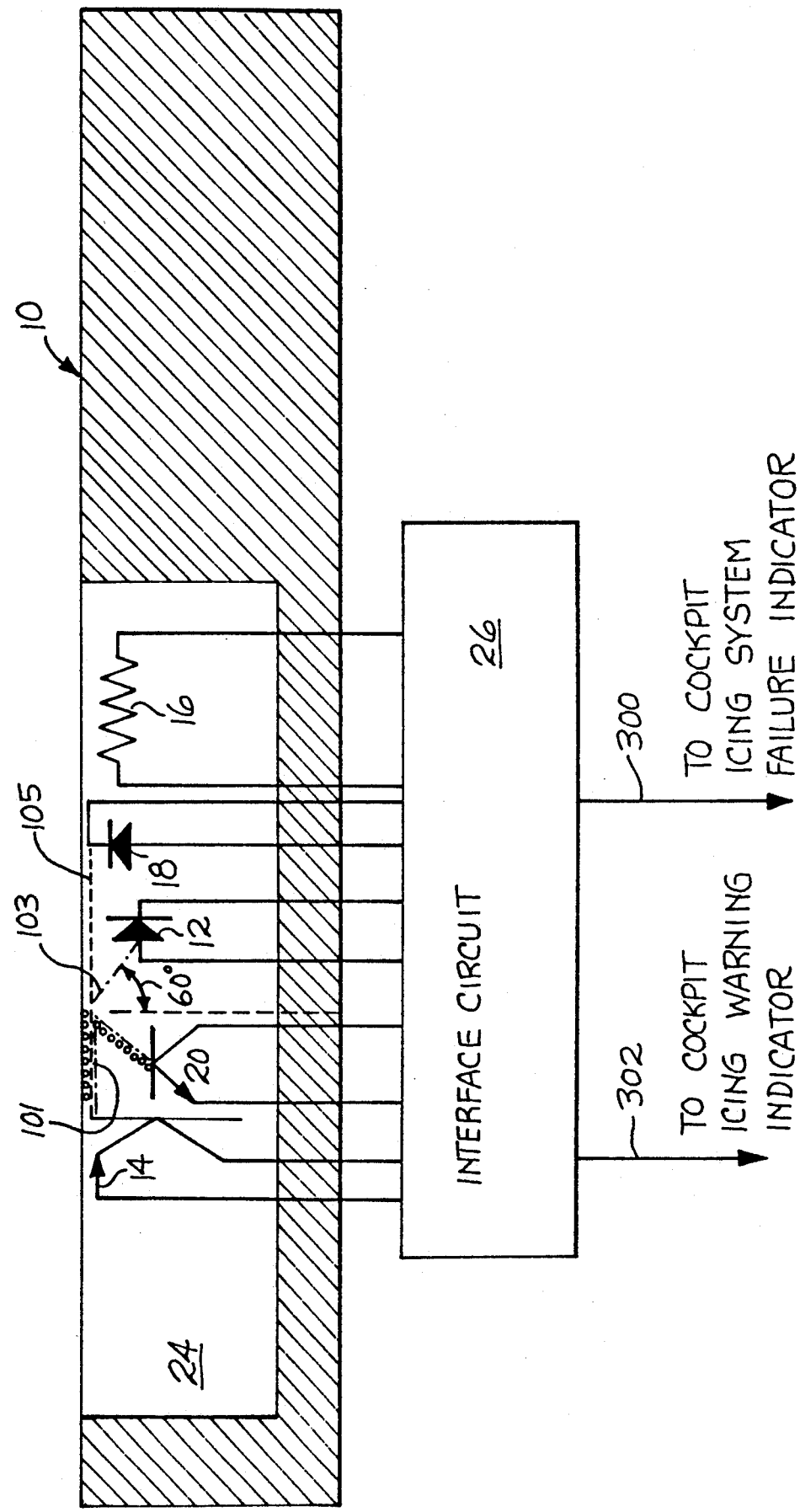
FIG. 1 is a schematic diagram of the detector system of the present invention in the non-icing condition.

The present detector systems for detecting the formation of ice on an aircraft surface 10 as shown in FIG. 1 includes a detector light source, a photodetector 14, and a thermistor 16 which connect to interface circuit 26. In addition there is a Built In Test Equipment (BITE) light source 18 and a BITE photodetector 20 to verify the detector against failures. The light sources and photodetectors are embedded in an optical plastic or glass 24 which is mounted flush with the surface of the aircraft, which means that the detector has no effect on the aerodynamics of the aircraft. Light source 12 and photodetector 20 are arranged such that light 101 emitted from light source 12 refracts along the plastic surface 24 and then is detected by the photodetector 14. The angle of the emitted light with respect to the normal to the plastic surface is less than the critical angle for total internal reflection when the surface has water or ice on it; however, it is greater than the critical angle when the surface is adjacent to air. The BITE photodetector 20 is also mounted to receive at this same angle such that light 103 from detector light source 12 is reflected to it. Photodetector 14 also senses light 105 from BITE light source 18 and from the ray that travels along surface 10 in the case of total internal reflection emitted from light source 12.

In the normal mode of operation, detector light source 12 transmits pulses at some arbitrary frequency (for example, 1000 Hz) and BITE light source 18 transmits some other arbitrary frequency (for example, 100 Hz). Detector photodetector 14 receives both of these signals and passes them to analog interface circuit 26. Interface circuit 26 includes filters to detect the two carriers and will assert the discrete signals as appropriate. Interface circuit 26 also contains oscillators to drive the light sources. In addition, interface circuit 26 contains logic to drive BITE light source 18 at the detection frequency to detect failures in the interface circuitry.

When there is no water on the surface 24, the light 101 from light source 12 is totally internally reflected from the air to medium interface 10 to photodetector 14. At the same time pulses at a different frequency travel along path 105 from the BITE light source 18 to the receiver photodetector 14. Interface circuit 26 detects the two frequencies and shows no ice detected and no failure.

Figure 2:
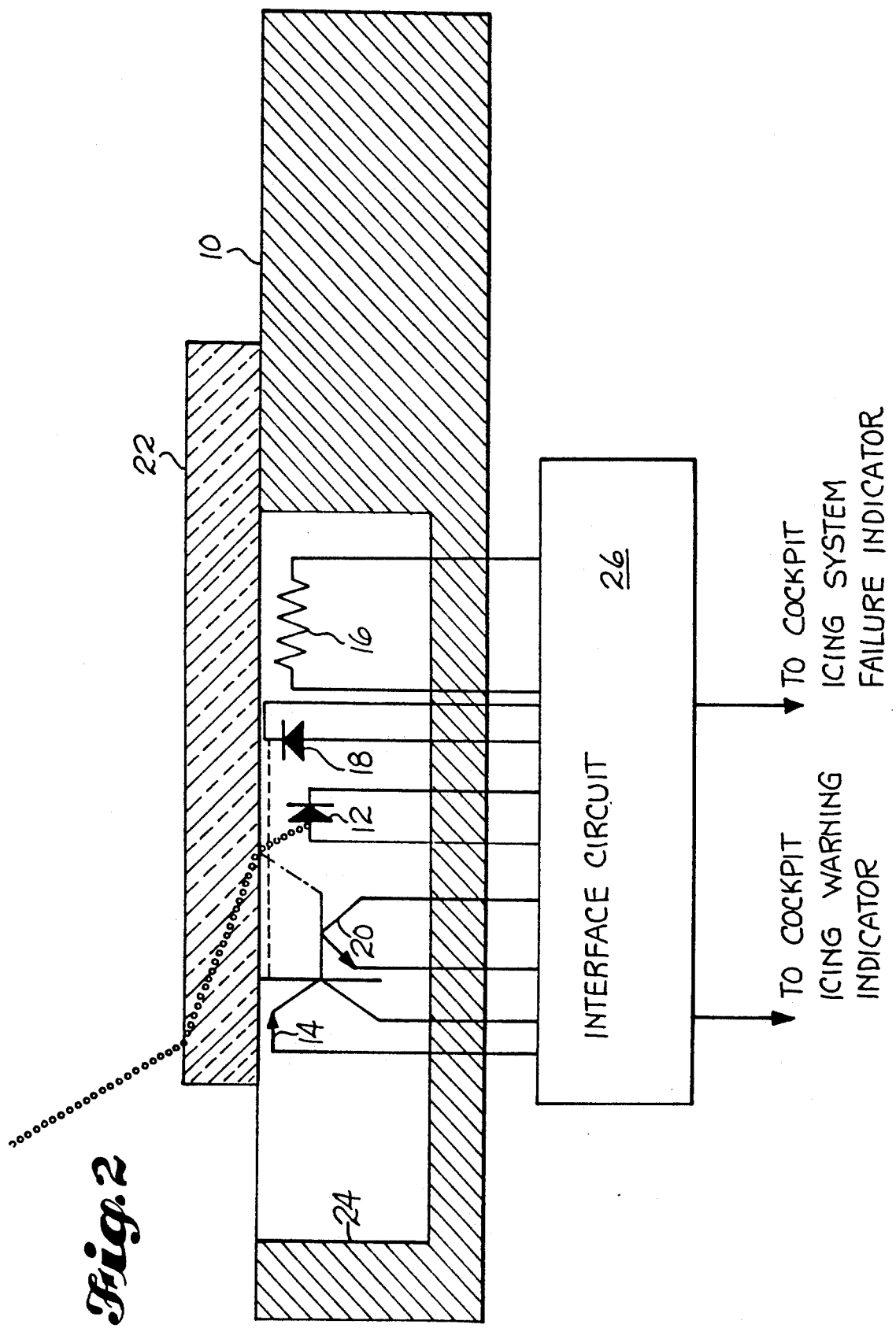
FIG. 2 is representative of the refraction of the light pulse due to the presence of water (either frozen or liquid) on the surface of the aircraft.

Turning now to FIG. 2, it can be seen that when there is water or ice 22 on the surface, then total internal reflection does not occur. Instead, the signal 101 is refracted outside the surface 10. Photodetector 14 will therefore receive no signal from detector light source 12. However, photodetector 14 still detects BITE signal 105 from the BITE light source 18, and photodetector 20 now detects the detection signal 103 from light source 12. If the BITE signal 105 is detected from photodetector 14 and the detecting signal 103 is detected from BITE photodetector 20 then there is moisture on the surface 24 of the aircraft. The thermistor 16 gives the temperature reading to see if the water is ice or liquid.

If the transmitter light source 12 should fail, then photodetector 20 will no longer detect the detection signal 103, although photodetector 14 will detect the BITE signal. Interface circuit 26 will then generate an error indication.

If the photodetector 14 fails, then it will no longer detect BITE signal 105. The interface circuit will then generate an error indication. Note that it is possible to detect failures in interference circuitry 26 by altering the frequency of the light sources under microprocessor control.

The interface circuit 26 can be implemented using an analog to digital converter, an analog multiplexer and a microprocessor. Or, it can be implemented entirely in hardware using threshold detectors, oscillators, pulse stretchers and digital logic.

The use of pulsed light allows the detection circuit to easily differentiate between the detection signal and bright sunlight. The use of infrared light also enhances signal detection because bright sunlight is poor in infrared. However, the invention will work with visible light and with continuous light. For additional separation between sunlight and detection signal, the media 24 may be an optical glass that does not transmit in the visible band. The use of solid state light sources such as Light Emitting Diodes (LEDs) or infrared lasers make the device inexpensive and reliable.

In FIGS. 1, 3, 4, and 5, the angle shown as 60° (degrees)~arc sin (1.3/1.5) where 1.3 is the refractive index of water or ice and 1.5 is a typical value of the refractive index of the plastic or glass 24. Actual angle will depend on specific plastic or glass.

Figure 3:
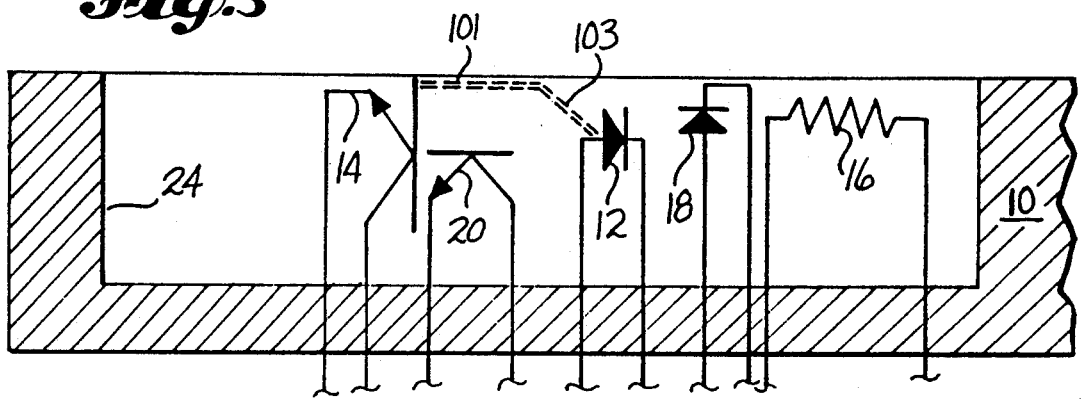
FIG. 3 is a schematic diagram of the detector system of FIG. 1 showing Built In Test Equipment (BITE) signal paths for testing the photodetector and the light source.
Figure 4:
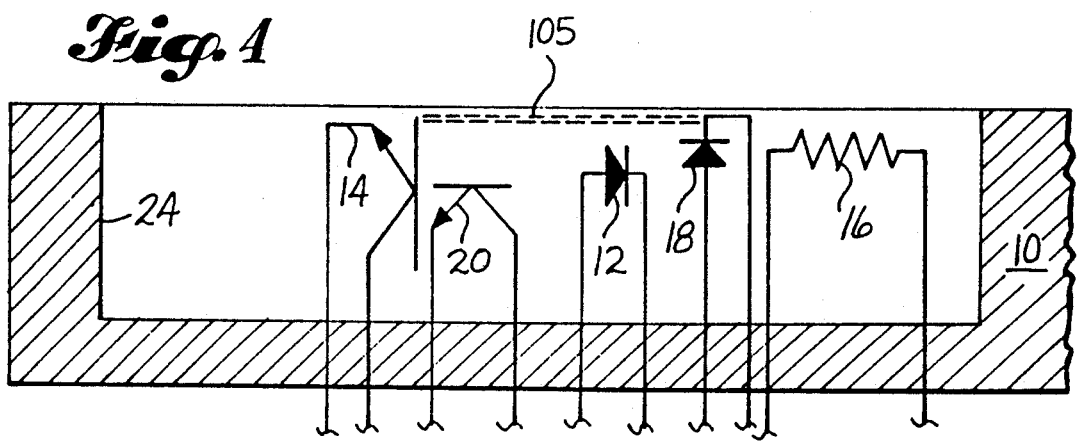
FIG. 4 is a schematic diagram of the detector system of FIG. 1 showing the light path (105) of the photodetector self test.

Signal path 101 in FIGS. 1, 2, and more clearly in FIG. 3 is the photodetector signal path. Self test light path 105 for photodetector 14 is shown in FIGS. 1, 2, and more clearly in FIG. 4. If photodetector 14 or its receiver circuit should fail, or if diode 18 or its driver circuit should fail, then photodetector 14 will not detect the BITE signal. If photodetector 14 is detecting the detection signal 101 then light source 12 and photodetector 14 are operative.

Figure 5:
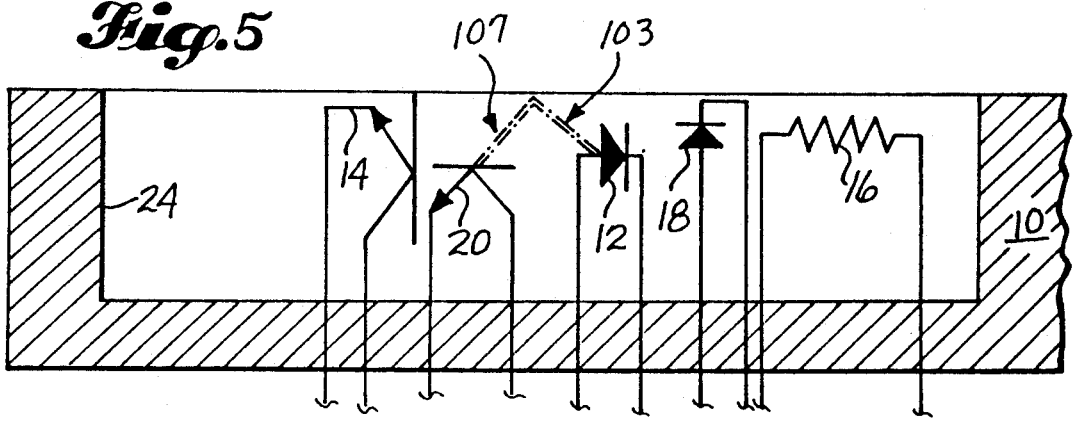
FIG. 5 is a schematic diagram of the detector system of FIG. 1 showing the light path (103) of the light source self test.

FIG. 5 shows the transmitter built in test signal path 103 only. Light from light source 12 reflects off of the interface and is detected by photodetector 20. If light source 12 or its driver circuit should fail, or if photodetector 20 or its receiver circuit should fail, then the BITE signal will not be detected.

Figure 6:
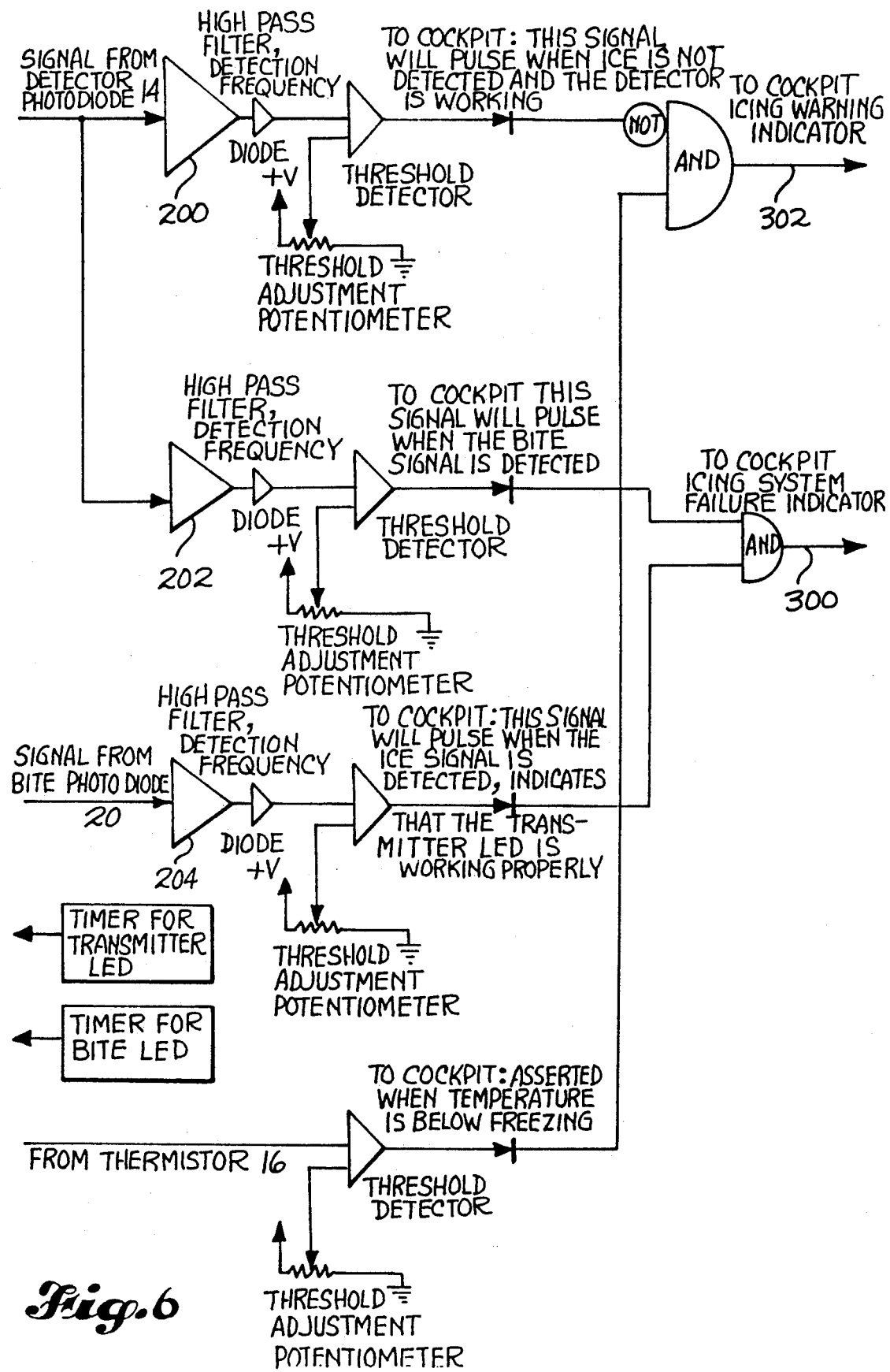
FIG. 6 is a more detailed circuit schematic showing interface circuit electronics of the detector system of FIG. 1.

FIG. 6 shows an exemplary interface circuit 26 which includes logic and signal proceeding circuits to provide the cockpit indicator lamp energizations of FIG. 1 for the desired indications.

Figure 7:
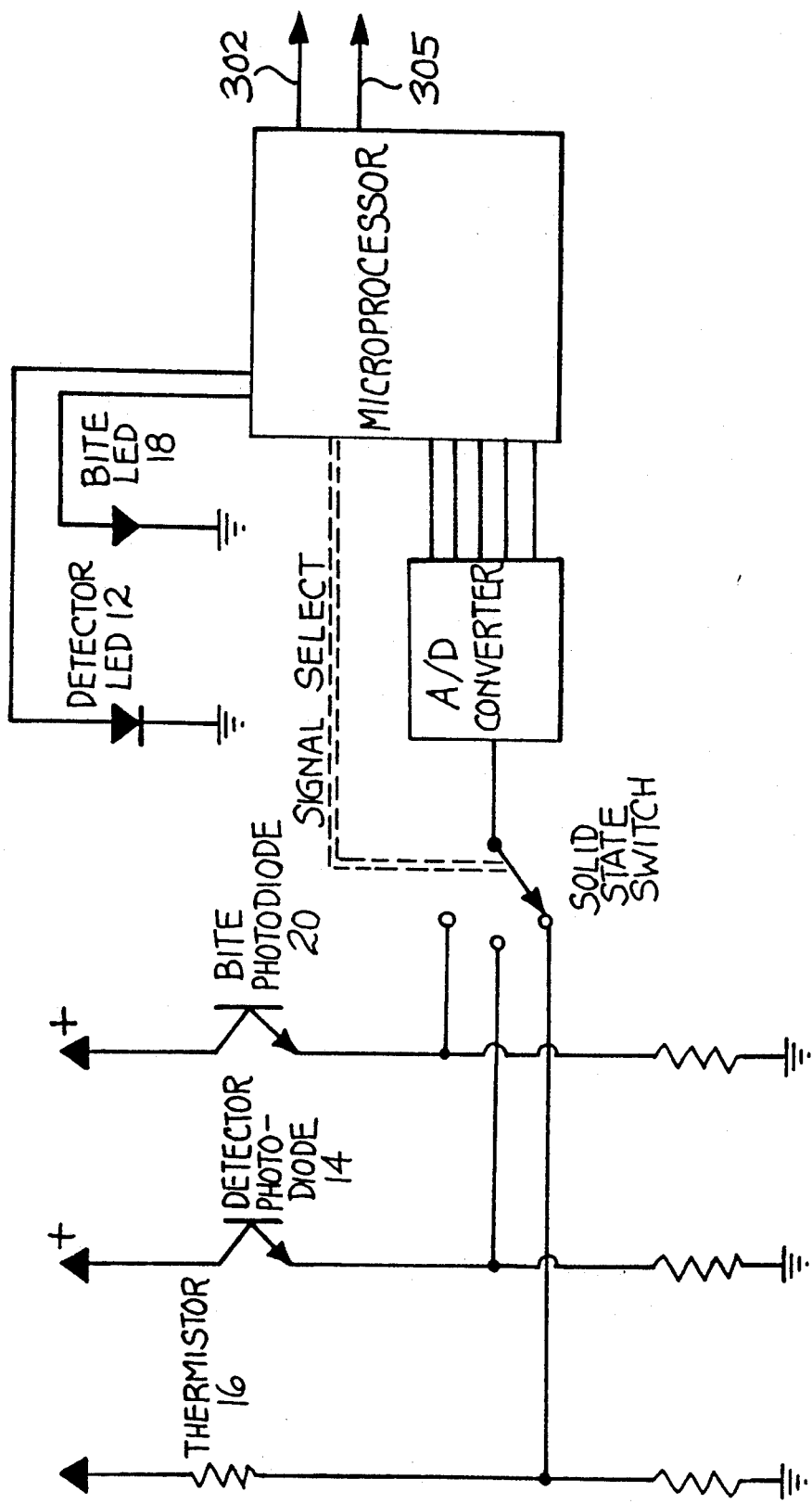
FIG. 7 shows a further exemplary interface circuit for coupling the output of the photodetectors and the thermistor through an analog to digital converter; and, FIG. 8 is a diagram explanatory of the physics of refraction of an electromagnetic wave and the interface between two, dissimilar dielectric media.

FIG. 7 shows a further exemplary interface circuit for coupling the output of photodetectors 14 and 20 and thermistor 16 through an analog to digital converter.

FIG. 8 is a diagram exemplary of the physics of refraction of an electromagnetic wave and the interface between two, dissimilar dielectric media.

The Built In Test Equipment (BITE) feature of the present system is advantageous in that no tedious calibration, tuning, or testing is required. Also the system is fail-safe even without the BITE equipment: if either photodetector 14 fails or light source 12 fails, then the system hereinbefore described will assert the icing indication to the cockpit indicator. It should be further noted that this is true even if these devices fail in the "turned on" failure mode since the detector circuit of the system is looking for pulses of light.

Certain further unique features of the present system are described hereinafter, although it should be mentioned that the arrangement of optical elements, the use of pulsed light instead of steady light to avoid interference from the sun and other ambient lighting, and the Built In Test Equipment (BITE) optics ensure fail-safe operation.

The interface circuit 26 may include:

1. A driver circuit (not shown) for the detection light source 12. This circuit, which might be a timer with capacitors and resistors to generate a stream of pulses at a frequency, e.g., 100 Hz.

2. A driver circuit (not shown) for the Built In Test Equipment (BITE) light source 18. This circuit, which is identical to (1) except for component values, generates a stream of pulses at a different frequency, e.g. 2000 Hz.

3. A high pass filter which is coupled to the detector photodetector 14 which detects the detection signal. This high pass filter is tuned to the driver (1) above. This high pass filter should reject the BITE signal and also extraneous light sources such as sunlight, airport lights, lightning, etc.

4. A further high pass filter 202 which is coupled to the detector photodetector 14 and which detects the BITE signal. This further high pass filter is tuned to the BITE driver (2) above. This further high pass filter rejects the detection frequency and also extraneous light sources.

5. A third high pass filter which is coupled to the BITE photodetector 20 which detects the detection signal. This third high pass filter is tuned to the detection frequency of the driver (1) above.

6. A threshold detector which compares the signal from thermistor 16 and asserts an output if thermistor 16 is sensing below freezing temperatures. The output of the threshold detector is a digital signal which may drive cockpit logic directly as desired.

In all cases, the outputs of the high pass filters are rectified by the diodes shown downstream and then threshold detected. The output of threshold detector is a stream of pulses. External logic can either wait for the pulse to arrive and generate an alarm condition if a timeout occurs, or the outputs may be combined with simple combinatorial logic as shown on the right side of FIG. 6 of exemplary interface circuit 26 to generate the outputs 300 and 302 for pilot recognition.

While a preferred analog embodiment of the system has been described, an alternative interface circuit 26 for cost effectiveness might consist of coupling the outputs of photodetectors 14 and 20 and thermistor 16 through an analog to digital (A/D) converter as shown in FIG. 7 with the resulting digital data processed in a microcomputer which would be also capable of interfacing with a data network.

The following sample computer program code in "Ada" programming language might be utilized for the microprocessor shown in the system of FIG. 7:

```
with ADC_PACKAGE; use ADC_PACKAGE;
procedure ICING_DETECTOR_ALGORITHM is
-- thresholds
  ICING_THRESHOLD : constant := {static expression};
  FREEZING_THRESHOLD : constant := {static_expression};
  TRANSMITTER_LED_OKAY_THRESHOLD : constant := {static_expression};
-- internal discretes
  type ADC_INPUTS is (SIGNAL_PHOTODIODE,
    BITE_PHOTODIODE, THERMISTOR);
    WATER_DETECTED, FREEZING, TRANSMITTER_LED_OKAY, RECEIVER
    PHOTODIODE_OKAY : BOOLEAN;
-- external discretes
  ICING, DETECTOR_OKAY : BOOLEAN := FALSE;
begin
  INITIALIZE;
  loop
    RECEIVER_PHOTODIODE_OKAY := FALSE
    TRANSMITTER_LED_OKAY := FALSE; -- assume bad LED for
    now
    -- First, do the regular icing detection
    ADC_SELECT (ADC_INPUT => SIGNAL_PHOTODIODE);
      TRANSMITTER_LED ( OFF );
      READ_ADC ( DARK_CURRENT );
      TRANSMITTER_LED ( ON );
      READ_ADC ( LIGHT_CURRENT );
      if LIGHT_CURRENT - DARK_CURRENT > ICING_THRESHOLD
      then WATER_DETECTED := FALSE;
        TRANSMITTER_LED_OKAY := TRUE;
        RECEIVER_PHOTODIODE_OKAY := TRUE;
    else
      WATER DETECTED := TRUE;
    end if;
      TRANSMITTER_LED ( OFF );
    -- Now, test the transmitter LED using the BITE photodiode.
    -- If we know that transmitter LED is okay
    if not TRANSMITTER_LED_OKAY then
      ADC_SELECT (ADC_INPUT => BITE_PHOTODIODE);
      TRANSMITTER_LED ( OFF );
      READ_ADC ( DARK_CURRENT );
      TRANSMITTER_LED ( ON );
      READ_ADC ( LIGHT_CURRENT );
      TRANSMITTER_LED_OKAY := LIGHT_CURRENT - DARK_CURRENT >
        TRANSMITTER_LED_OKAY_THRESHOLD :
      TRANSMITTER_LED ( OFF );
    end if;
    if not RECEIVER_PHOTODIODE_OKAY then
    -- now, test the signal photodiode using the BITE LED
      ADC_SELECT ( ADC_INPUT => BITE_PHOTODIODE );
      BITE_LED ( OFF );
      READ_ADC ( DARK_CURRENT );
      BITE_LED ( ON );
      READ_ADC ( LIGHT_CURRENT );
      RECEIVER_PHOTODIODE_OKAY := LIGHT_CURRENT -
      DARK_CURRENT
        > RECEIVER_PHOTODIODE_OKAY_THRESHOLD;
      BITE_LED ( OFF );
    end if;
    --Now, test the temperature
    ADC_SELECT (ADC_INPUT => THERMISTOR);
    READ_ADC (THERMISTOR_CURRENT);
    FREEZING := THERMISTOR_CURRENT < FREEZING_THRESHOLD;
    --Do the cockpit indicators
      ICING := WATER_DETECTED and FREEZING;
      DETECTOR_OKAY := RECEIVER_PHOTODIODE_OKAY and
      TRANSMITTER_LED_OKAY; end loop;
    end ICING_DETECTOR_ALGORITHM;
```

What is claimed is:

1. An ice detector system for detecting the formation of ice on an aircraft outer surface comprising:
   first and second infrared lasers having first and second terminals;
   first and second infrared photodetectors having first and second terminals;
   a thermistor having first and second terminals; and, said first infrared laser and said first infrared photodetector disposed in said aircraft outer surface for detecting formation of ice through a change in refractive index of the space near said aircraft outer surface;

said second infrared laser and said second infrared photodetector disposed in said aircraft outer surface for testing said first infrared laser and said first photodetector; and, interface circuit means coupled to said first and second terminals of said first and second lasers, said first and second terminals of said first and second infrared photodetectors and said first and second terminals of said thermistor(s) for providing a cockpit output signal representative of icing warning and a cockpit signal representative of ice detector system failure.

2. A fail-safe ice detector system for an aircraft outer surface comprising in combination:

a detector photodetector 14 for providing for detection of the formation of ice on said aircraft outer surface;

a BITE photodetector 20 for providing for verification against ice detector system failures;

a high pass filter, diode, and threshold detector coupled in series circuit with said detector photodetector 14 for providing a pulse signal when ice is NOT detected and said detector is functional;

a high pass filter, diode, and threshold detector coupled in a series circuit with said detector photodetector 14 for providing a cockpit pulse signal upon detection of a BITE signal; and, a high pass signal, diode, and threshold detector coupled in series circuit with said BITE photodetector 20 for providing a cockpit pulse signal upon ice detection.

3. A fail-safe ice detector system for an aircraft outer surface comprising in combination:

a first light source and light detector pair;

an optical insert disposed in said aircraft outer surface containing said first light source and light detector pair for detecting the formation of ice through a change in refractive index of the space near said aircraft outer surface;

a second light source and light detector pair for testing said first light source and light detector pair;

a device for measuring ambient air temperature;

interface circuit means coupled to said first light source and light detector pair and device for measuring ambient air temperature, so as to provide a true or false indication that either ice is not forming and the light detector of said first light source and light detector pair is operational, or ice if forming and/or said light detector of said first light source and light detector pair is not operational; and, further interface circuit means coupled to said second light source and light detector pair for providing a true/false indication that the ice detector system is operational.

4. A fail-safe ice detector system for a surface comprising in combination;

a light source;

a light detector;

an interface circuit coupled to said light source and said light detector which will produce a true output if, and only if, no ice is detector and said fail-safe ice detector system is operational, and, a self-testing subsystem for diagnosing failure in said fail-safe ice detector system comprising in combination;

a testing light source arranged to transmit light on said light detector;

a test light detector responsive to light from said light source;

a test interface circuit coupled to said test light source and said test light detector for producing a true output signal if, and only if, both said light source and said light detector are operational; and, said test interface circuit providing testing of said fail-safe ice detector system when said fail-safe ice detector system is not ice detecting.

* * * * *